United States Patent Office 2,904,421
Patented Sept. 15, 1959

2,904,421

METHOD OF DESTROYING GRASSES

William H. Seaton, Columbus, Ohio, assignor to Monsanto Chemical Company, St. Louis, Mo., a corporation of Delaware No Drawing. Application June 21, 1954
Serial No. 438,352

2 Claims. (Cl. 71—2.3)

This invention relates to a method of destroying vegetation and to herbicidal compositions. More particularly it relates to a method of destroying vegetation which comprises applying a lethal concentration of the methyl ether of 2,4,5-trichlorophenol.

A particular object of the invention is to provide herbicidal compositions which are effective against grasses. A further particular object is to provide herbicidal compositions which destroy or control grasses when applied to the ground before the grass emerges. A general object of the invention is to provide compositions for the destruction of noxious vegetation. Further objects wlil be apparent from the detailed description following.

The discovery of compounds toxic to broadleaf plants but relatively innocuous to grasses has created considerable demand for compounds to destroy undesirable grasses. For example 2,4,5-trichlorophenoxyacetic acid is toxic to broadleaf plants but essentially harmless to grasses. It is therefore remarkable that the methyl ether of 2,4,5-trichlorophenol is an outstanding grass-specific herbicide especially effective in pre-emergence application. These properties are not shared by other ethers of 2,4,5-trichlorophenol.

Application may be in the form of a spray or as a dust, preferably the former. Concentrations of the active ingredient within the range of 0.1%–10.0% comprise suitable concentrations for most practical purposes. For the formulation of dry compositions clay, fuller's earth, diatomaceous earth, pyrophyllite, charcoal, chalk and the like are suitable diluents and carriers and of course may be included in the spray composition if desired. Either water, organic solvents or mixtures thereof may be used to formulate spray compositions and emulsifiable concentrates. The toxicant may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents.

When pure, 2,4,5-trichloroanisole is a white solid, M.P. 77.5° C. The technical product usually melts at about 72° C. Although insoluble in water, it is very soluble in ether, acetone, benzene, heptane, chloroform, ethanol and ethyl acetate. Examples of grasses controlled are foxtail, cheat grass, wild oats, rye grass and crab grass. For example, covering the foliage of grasses with an aqueous spray containing 0.3% by weight of 2,4,5-trichloroanisole injured the grasses whereas a range of broadleaf plants were not significantly affected. However, the grass-specific herbicidal effect was much stronger when the toxicant was applied to the ground before the grass emerged. Other lower ethers such as the ethyl, butyl and cyclohexyl ethers did not approach the activity of 2,4,5-trichloroanisole. Higher ethers, as for example the undecyl ether, was even less active and moreover were more injurious to broadleaf plants than to grasses. Over the same range of concentrations, in both foliage and pre-emergence applications, the 2-hydroxy ethyl ether exhibited strong general herbicidal activity, the grass specificity disappearing.

Application of 2,4,5-trichloroanisole to the ground at the rate of 10 pounds per acre before the plants emerged resulted in severe phytotoxicity to a range of grasses which included wild oat, rye grass, buckwheat and wheat. Significant herbicidal activity has been exhibited over the range of 1–50 pounds per acre. The amount to use for optimum results will vary depending upon conditions existing at the time of application. Application at the rate of 5–10 pounds per acre assures effective strong grass-specific herbicidal action under most conditions.

It is intended to cover all changes and modifications of the examples of the invention herein chosen for purposes of disclosure which do not constitute departures from the spirit and scope of the invention.

What is claimed is:

1. The method of destroying grass which comprises applying to the ground before the grass emerges a lethal concentration of 2,4,5-trichloroanisole.

2. The method which comprises applying to grasses before emergence 2,4,5-trichloroanisole at the rate within the range of 5 to 50 pounds per acre.

References Cited in the file of this patent

UNITED STATES PATENTS

| | | |
|---|---|---|
| 2,327,338 | Carswell | Aug. 24, 1943 |
| 2,396,513 | Jones | Mar. 12, 1946 |
| 2,573,769 | Lambrech | Nov. 6, 1951 |
| 2,777,762 | Toornman | Jan. 15, 1957 |

OTHER REFERENCES

Chemical Abstracts, vol. 47 (1953), col. 5497c, vol. 37 (1943), col. 50364.